US012806573B2

(12) United States Patent
Volmering et al.

(10) Patent No.: US 12,806,573 B2
(45) Date of Patent: Nov. 24, 2026

(54) MEMBRANE FILTER AND METHOD FOR PRODUCING A MEMBRANE FILTER

(71) Applicant: MEMBION GMBH, Roetgen (DE)

(72) Inventors: Dirk Volmering, Aachen (DE); Klaus Vossenkaul, Aachen (DE)

(73) Assignee: MEMBION GMBH, Roetgen (DE)

( * ) Notice: Subject to any disclaimer, the term of this patent is extended or adjusted under 35 U.S.C. 154(b) by 353 days.

(21) Appl. No.: 18/431,988

(22) Filed: Feb. 4, 2024

(65) Prior Publication Data

US 2024/0261732 A1 Aug. 8, 2024

Related U.S. Application Data

(63) Continuation of application No. PCT/EP2022/068774, filed on Jul. 6, 2022.

(30) Foreign Application Priority Data

Sep. 20, 2021 (DE) .......................... 10202124250.9

(51) Int. Cl.
*B01D 61/18* (2006.01)
*B01D 63/02* (2006.01)
*B01D 63/04* (2006.01)

(52) U.S. Cl.
CPC ............. *B01D 63/04* (2013.01); *B01D 61/18* (2013.01); *B01D 63/0231* (2022.08); *B01D 2313/21* (2013.01); *B01D 2315/06* (2013.01)

(58) Field of Classification Search
CPC ................ B01D 63/04; B01D 63/0231; B01D 2313/21; B01D 2315/06; B01D 2313/02;
(Continued)

(56) References Cited

U.S. PATENT DOCUMENTS 5,248,424 A * 9/1993 Cote ...................... B01D 61/18
210/321.89
7,037,426 B2 5/2006 Pedersen
(Continued)

FOREIGN PATENT DOCUMENTS

DE 102019115265 A1 12/2020
DE 102019129074 B3 1/2021
WO WO2004078326 A2 9/2004

*Primary Examiner* — Joseph W Drodge
(74) *Attorney, Agent, or Firm* — Von Rohrscheidt Patents

(57) ABSTRACT

A membrane filter for filtering a liquid by submerged operation, the membrane filter comprising membrane elements arranged horizontally adjacent to one another and including headers, each membrane element including membranes arranged in a vertical longitudinal direction and filtering a liquid permeate from the liquid, a header of the headers that is arranged at a uniform header level and includes a permeate collection cavity, wherein the membranes are connected at a permeate side of the permeate collection cavity, a permeate outlet draining the liquid permeate in an outlet direction horizontally from the permeate collection cavity, and a tube connected at a top of the header and laterally enveloping the membranes of the membrane element, wherein the permeate outlet of each of the membrane elements is connected at a horizontally extending common permeate collector that drains the liquid permeate from the membrane filter.

12 Claims, 13 Drawing Sheets

(58) Field of Classification Search
CPC ............ B01D 2313/06; B01D 2313/12; B01D 2313/131; B01D 63/024; B01D 61/18; B01D 63/021; B01D 2313/08; B01D 2313/125; B01D 2321/18; B01D 2321/185; C02F 3/1273
See application file for complete search history.

(56) References Cited

U.S. PATENT DOCUMENTS

| | | | | |
|---|---|---|---|---|
| 2004/0206683 | A1 | 10/2004 | Cote | |
| 2004/0238432 | A1* | 12/2004 | Mahendran | B01D 63/023 210/321.89 |
| 2005/0178728 | A1* | 8/2005 | Behmann | B01D 63/043 210/651 |
| 2007/0007207 | A1* | 1/2007 | Mahendran | B01D 63/027 210/636 |
| 2009/0321344 | A1* | 12/2009 | Lee | B01D 63/02 210/321.72 |
| 2016/0207004 | A1* | 7/2016 | Volmering | B01D 63/043 |
| 2019/0209970 | A1* | 7/2019 | Volmering | B01D 65/02 |
| 2019/0247772 | A1 | 8/2019 | Han | |

* cited by examiner

MEMBRANE FILTER AND METHOD FOR PRODUCING A MEMBRANE FILTER

RELATED APPLICATIONS

This application is a continuation of International patent application PCT/EP2022/068774 filed on Jul. 6, 2022 claiming priority from German patent application 10 2021 124 250.9 filed on Sep. 20, 2021, both of which are incorporated in their entirety by this reference.

FIELD OF THE INVENTION

The invention relates to a membrane filter for submerged operation for filtering a liquid through membrane elements horizontally arranged adjacent to one another and respectively having the following features:

membranes arranged in a vertical longitudinal direction and configured to filter a liquid permeate from the liquid; and at least one header arranged at a header level and including a permeate collection cavity, wherein the membranes are connected at a permeate side of the permeate collection cavity, and a permeate outlet configured to drain the permeate in an outlet direction horizontally from the permeate collection cavity.

wherein the permeate outlets are connected at a horizontally extending common permeate collector that drains the permeate from the membrane filter. The invention also relates to a method for producing the membrane filter.

BACKGROUND OF THE INVENTION

A generic membrane filter and a generic method are disclosed in U.S. Pat. No. 7,037,426 B2. The known membrane filter includes a permeate collector arranged above the membrane elements. The permeate is initially run from the permeate outlets of the headers arranged at bases of the membrane elements through conduits parallel to the membranes in an upward direction into the permeate collector arranged above a liquid surface and arranged parallel to the liquid surface. The permeate outlets are only inserted into the conduits by form locking. US 2004/0188339 A1 discloses a membrane filter where the permeate is drained from the permeate collection cavity vertically.

BRIEF SUMMARY OF THE INVENTION

It is an object of the invention to simplify production of the membrane filter. Improving upon the known membrane filter the object is achieve by A membrane filter for filtering a liquid by submerged operation, the membrane filter comprising membrane elements arranged horizontally adjacent to one another and including headers, each membrane element including membranes arranged in a vertical longitudinal direction and filtering a liquid permeate from the liquid, a header of the headers that is arranged at a uniform header level and includes a permeate collection cavity, wherein the membranes are connected at a permeate side of the permeate collection cavity, a permeate outlet draining the liquid permeate in an outlet direction horizontally from the permeate collection cavity, and a tube connected at a top of the header and laterally enveloping the membranes of the membrane element, wherein the permeate outlet of each of the membrane elements is connected at a horizontally extending common permeate collector that drains the liquid permeate from the membrane filter, and wherein the common permeate collector is arranged at the uniform header level and laterally adjacent to the headers.

The membrane filter according to the invention advantageously includes protrusions and recesses at the headers and at the permeate collector, wherein the protrusions reach into the recesses and fix the headers in the longitudinal direction at the permeate collector. According to the invention, the header includes the protrusions and the permeate collector includes the recesses or vice versa the permeate collector includes the protrusions and the header includes the recesses.

Fixing the header at the permeate collector in the longitudinal direction is important e.g. for operating the membrane filter in membrane bioreactors (MBR). Thus, a gas, typically air, is injected between the membranes from below in order to flush the membranes. This flushing air is typically even introduced in pulses which causes alternating loads in the membrane element in the vertical direction. The vertical fixing of the headers at the permeate collector in the longitudinal direction thus facilitates a long-term sealing effect at the connections of the permeate outlets at the permeate collector.

According to the invention, the membrane elements of the membrane filter can include various types of membranes like e.g. hollow fiber membranes, plate membranes, pillow membranes or hollow fiber membranes connected to form curtains. The membranes themselves are typically ultra- or micro-filtration membranes with pore sizes between 0.02 and 1.0 μm. However, also other membranes from the fields of nanofiltration or low-pressure reverse osmosis can be used.

Advantageously the membrane filter according to the invention includes bars extending in the outlet direction and arranged at the permeate collector, wherein two respective bars support one of the headers at the permeate collector horizontally transversal to the outlet direction.

Advantageously, the membrane filter of this type according to the invention includes interlocking connections between the bars and the headers wherein the interlocking connections fix the headers at the permeate collector in the outlet direction. Thus, the membrane elements can be mounted in the membrane filter without using tools.

According to the invention the permeate collector can be assembled from individual elements, e.g. injection molded parts which may then be glued together. The bars can also be inserted and interlocked as individual components or additionally glued in.

Advantageously each of the membrane elements in the membrane filter according to the invention includes a tube which adjoins the respective header on top and laterally envelops the membranes of the respective membrane element. When using the membrane filters in membrane bioreactors this has the advantage that the gas introduced for flushing the membranes cannot laterally exit the area of the membranes and flow upward adjacent to the membranes without being used.

Further advantageously the membranes are hollow fiber membranes individually closed on top. When using hollow fiber membranes the hollow fiber membranes can be configured according to the invention in double header systems or single header systems. Both configurations of the membrane elements are within the spirit and scope of the invention. In double header systems the hollow fiber membranes are fixed in headers at a top and at a bottom. In a single header design the membranes are individually closed on top and float in the liquid to be filtered, whereas the membranes are only fixed in a base element at a bottom of the membranes. When the membrane filter are used in municipal membrane bioreactors, this has the advantage that hair and fibrous compounds included in the sludge to be filtered can be freely stripped upward from the membranes and flushed out of the membrane element. This significantly reduces the complexity of treating the waste water flowing in.

Advantageously additional headers are connected at a permeate side at an additional permeate collector above the header level at least at one additional header level in a membrane filter according to the invention. This can be the case e.g. when the membrane elements are double header systems where the membranes are fixed in a header at a top and at a bottom. In this case the lower headers are respectively connected at the permeate collector and the upper headers are respectively connected at the additional permeate collector as additional headers above the header level.

It is within the spirit and scope of the invention that the additional headers which are connected above the header level at an additional permeate collector, are associated with additional membrane elements that are mounted above the membrane elements connected at the permeate collector. This is the case in so called double decker membrane elements where two respective membrane elements or plural membrane elements are installed above one another in the filter. Thus, the membrane elements mounted at a level are respectively connected at a common permeate collector at this level.

Advantageously, a membrane filter according to the invention includes geyser elements arranged at a bottom of the headers and including a downward open gas collection cavity configured to collect an inflowing gas and including an outlet device configured to let the gas out in pulses into the respective header. Letting the gas out in pulses causes a significantly more effective flushing of the membranes and saves energy.

Improving upon the known method it is proposed according to the invention, that the permeate collector is arranged at the header level adjacent to the headers. The method according to the invention that is used to produce the membrane filter according to the invention is characterized by the advantages recited supra.

Advantageously, the headers according to the method according to the invention are only collected at the permeate collector by form locking. This has the advantage that no tools are required for mounting the membrane elements in the membrane filter.

Advantageously protrusions and recesses at the headers and at the permeate collector are inserted into one another in a method according to the invention. The protrusions inserted into the recesses block a linear movement of the respective headers relative to the permeate collector and fix the respective headers in the vertical direction at the permeate collector. Thus, vertical forces are received in the membrane element and the connection of the membrane element with the permeate collector through the permeate outlets is protected against getting damaged mechanically.

Also here it is within the spirit and scope of the invention, that either protrusions at the headers are inserted into recesses of the permeate collector or vice versa recesses of the header are inserted into protrusion at the permeate collector.

Advantageously the headers are inserted in the outlet direction between two respective bars at the permeate collector so that the bars fix the respective header in the horizontal direction transversal to the longitudinal direction. Thus, the protrusions are advantageously inserted into the recesses simultaneously. Thus, the bars support the insertion of the permeate outlet of the membrane element into openings of the permeate collector.

Advantageously interlocking connections between the bars and the headers interlock during insertion, in a method according to the invention and fix the respective header in the longitudinal direction. This facilitates that the inserted connections of protrusions and recesses do not disengage during operation, this means a reliable connection is provided between membrane elements and permeate collector.

Advantageously the membrane elements are initially engaged with an upper support at a top of a frame and the respective header is connected at the permeate collector thereafter according to a method according to the invention. Thus, the level of the permeate outlet is already moved proximal to the respective opening in the permeate collector which facilitates inserting the protrusions into the recesses when mounting the membrane element in the membrane filter.

Advantageously geyser elements are arranged below the membrane elements below the headers between two respective bars at the permeate collector, according to a method according to the invention, wherein the geyser elements respectively include a downward open gas collection cavity configured to collect an inflowing gas and an outlet device configured for pulsing exhaust of the gas into the respective header. Thus, the flushing effect of the introduced gas, e.g. in membrane bioreactors is significantly improved.

BRIEF DESCRIPTION OF THE DRAWINGS

The invention is subsequently described based on embodiments with reference to drawing figures, wherein.

DETAILED DESCRIPTION OF THE INVENTION

Figure 1A:
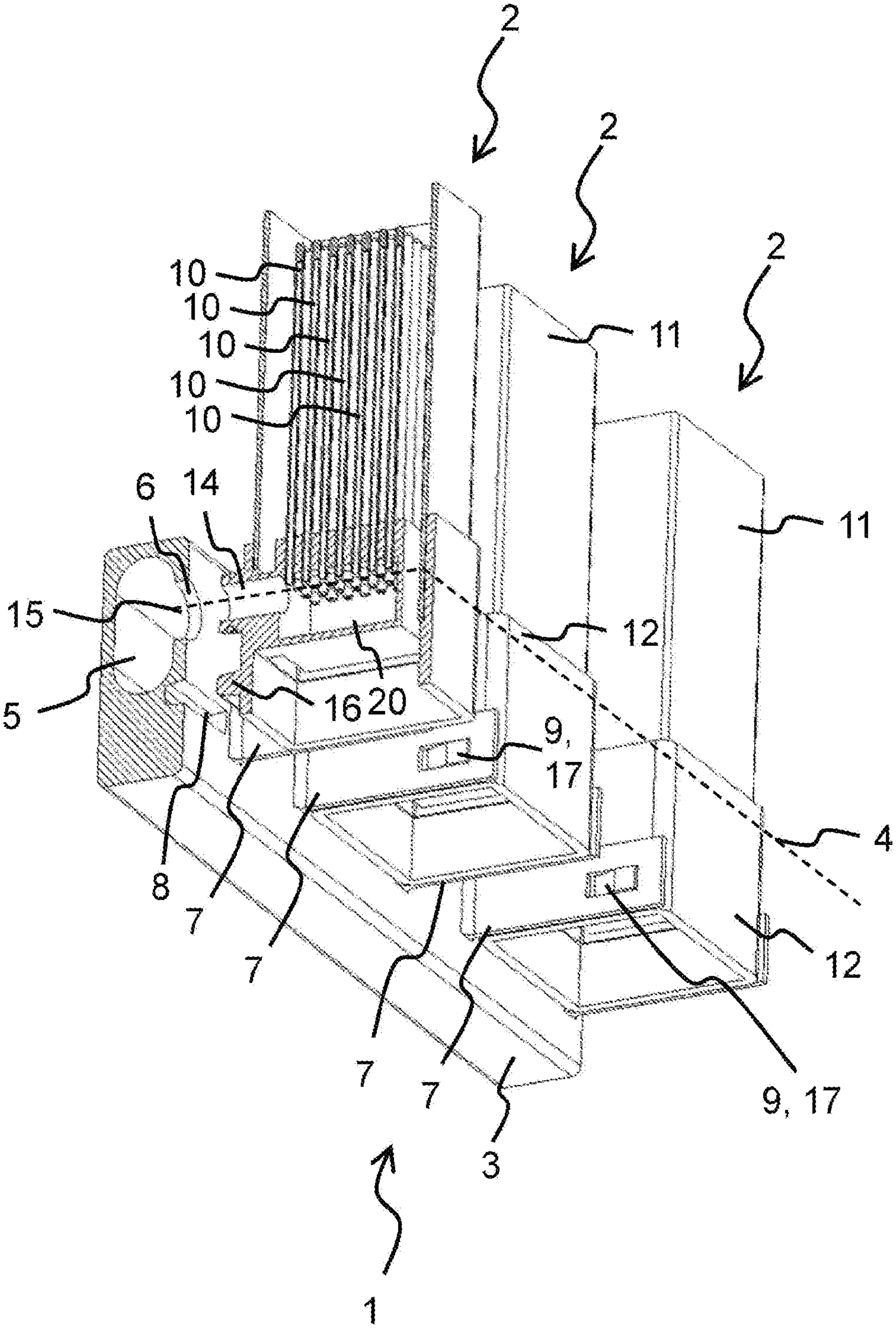
FIG. 1A illustrates a first membrane filter according to the invention.

The drawing figures illustrate schematic and not to scale representations showing the underlying principle of the invention.

The first membrane filter 1 according to the invention illustrated in FIG. 1A and configured to filter a liquid includes membrane elements 2 arranged horizontally adjacent to one another and a common permeate collector 3, wherein the membrane elements 2 are connected are connected at the common permeate collector 3.

The permeate collector 3 of the first membrane filter 1 has a cuboid basic shape and includes a longitudinally extending continuous oval channel 5 at a header level 4 and circular permeate openings 6 in the channel 5, two bars 7 for each header 12, and a recess 8. The bars 7 respectively include a groove 9.

Figure 1B:
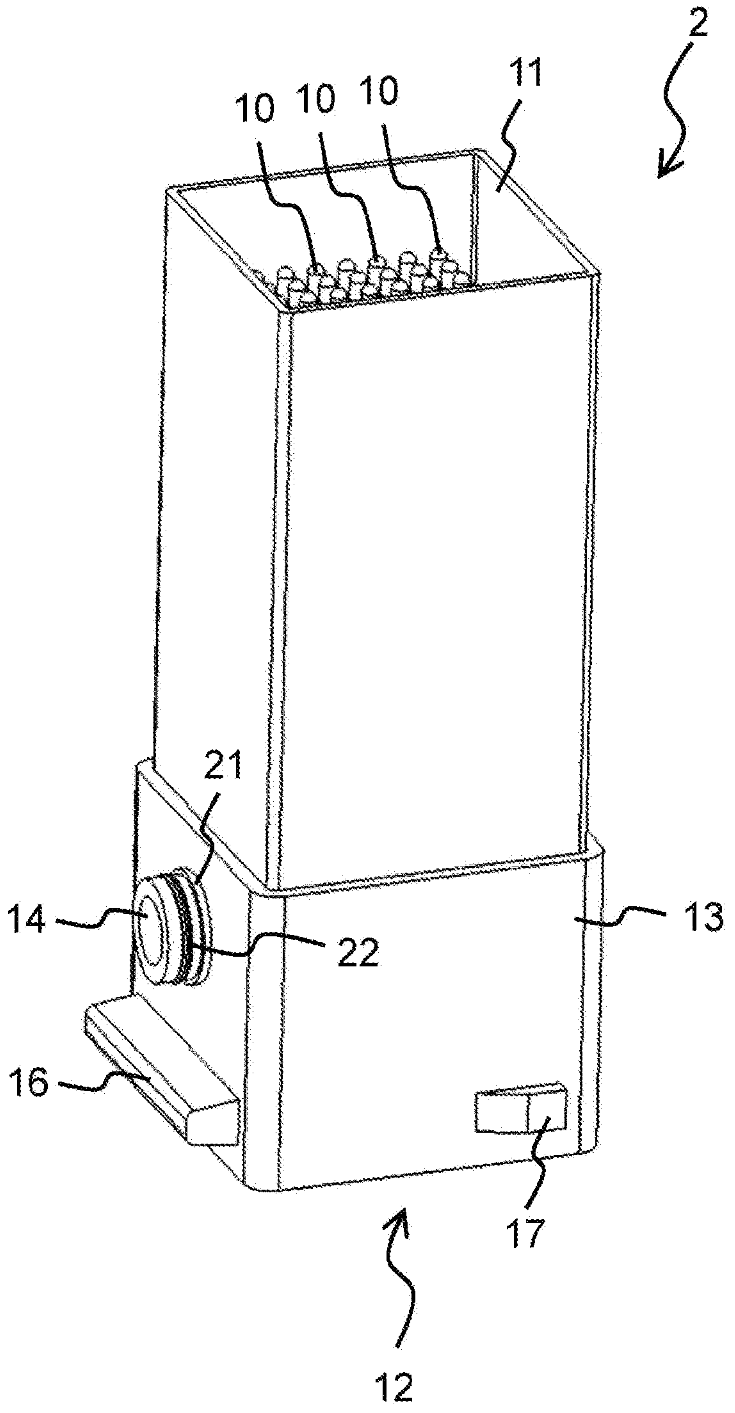
FIG. 1B illustrates a membrane element of the first membrane filter.

The membrane element 2 of the first membrane filter 1 illustrated in FIG. 1B includes membranes 10 individually closed on top and a tube 11 laterally enveloping the individually closed membranes 10, and a header 12 at a bottom.

Figure 1C:
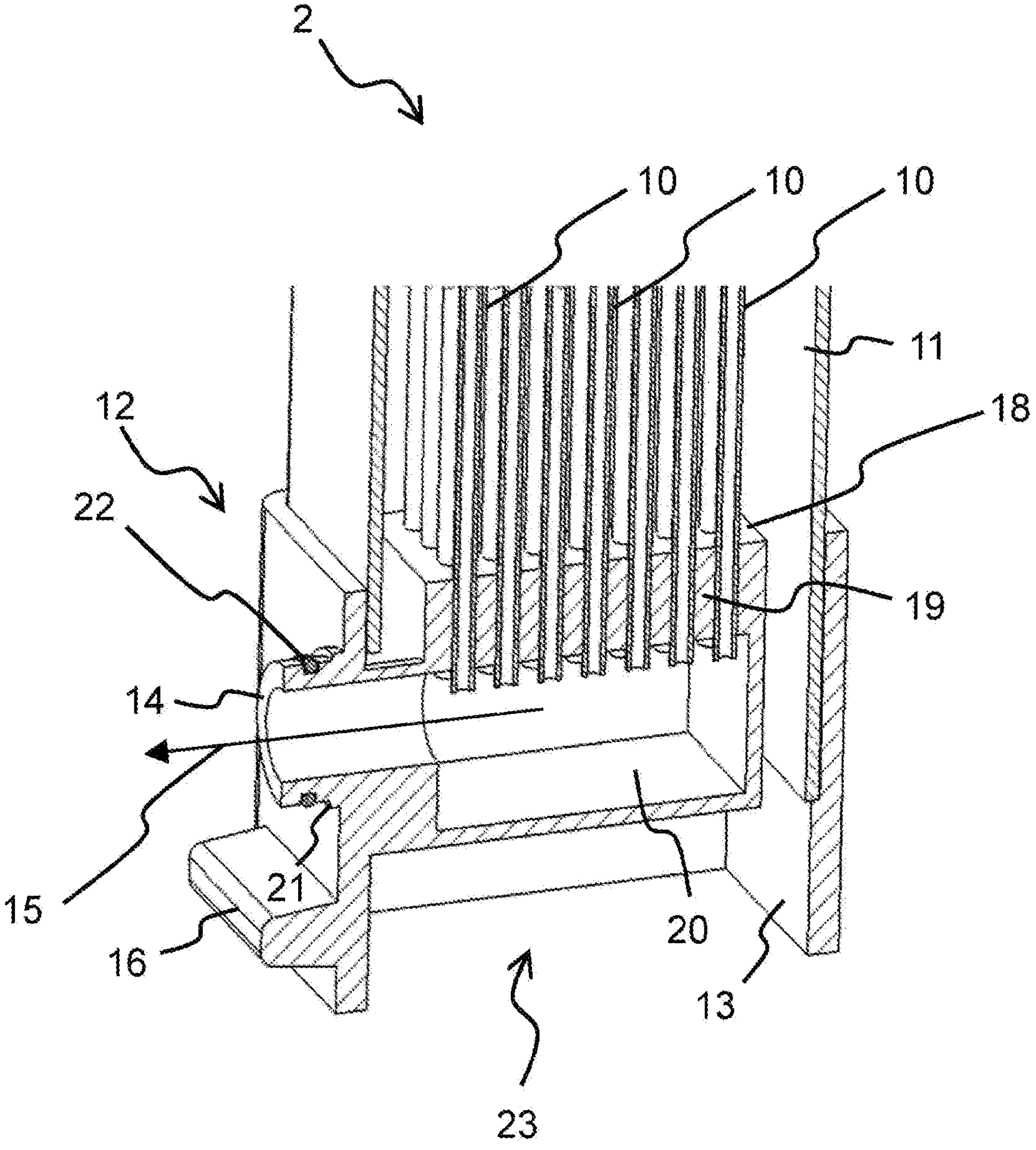
FIG. 1C illustrates a detail sectional view of the membrane element.

The header 12 shown in a sectional view in FIG. 1C, includes an essentially tubular housing 13 and a permeate outlet 14 arranged at the housing 13 in front at the membrane element 2 and configured to let the permeate out horizontally in an outlet direction 15 into the permeate collector 3, and a protrusion 16 and a laterally arranged lobe 17 respectively beveled towards the front side. The header 12 includes a membrane block 18 arranged in an interior of the housing 13, wherein the membranes 10 are fixed in the membrane block 18.

The membranes 10 penetrate a seal layer 19 in the membrane block 18 and lead into a permeate collection cavity 20. The permeate outlet 14 from the permeate collection cavity, is configured as a tubular spout, and includes an integrally formed collar 21 and a seal ring 22 made from a polymeric material. The header 12 includes an inlet opening 23 below the membrane block 18 wherein the liquid and a non-illustrated gas is conductible through the inlet opening 23 into an interior of the membrane element 2 for flushing the membranes 10.

Figure 1D:
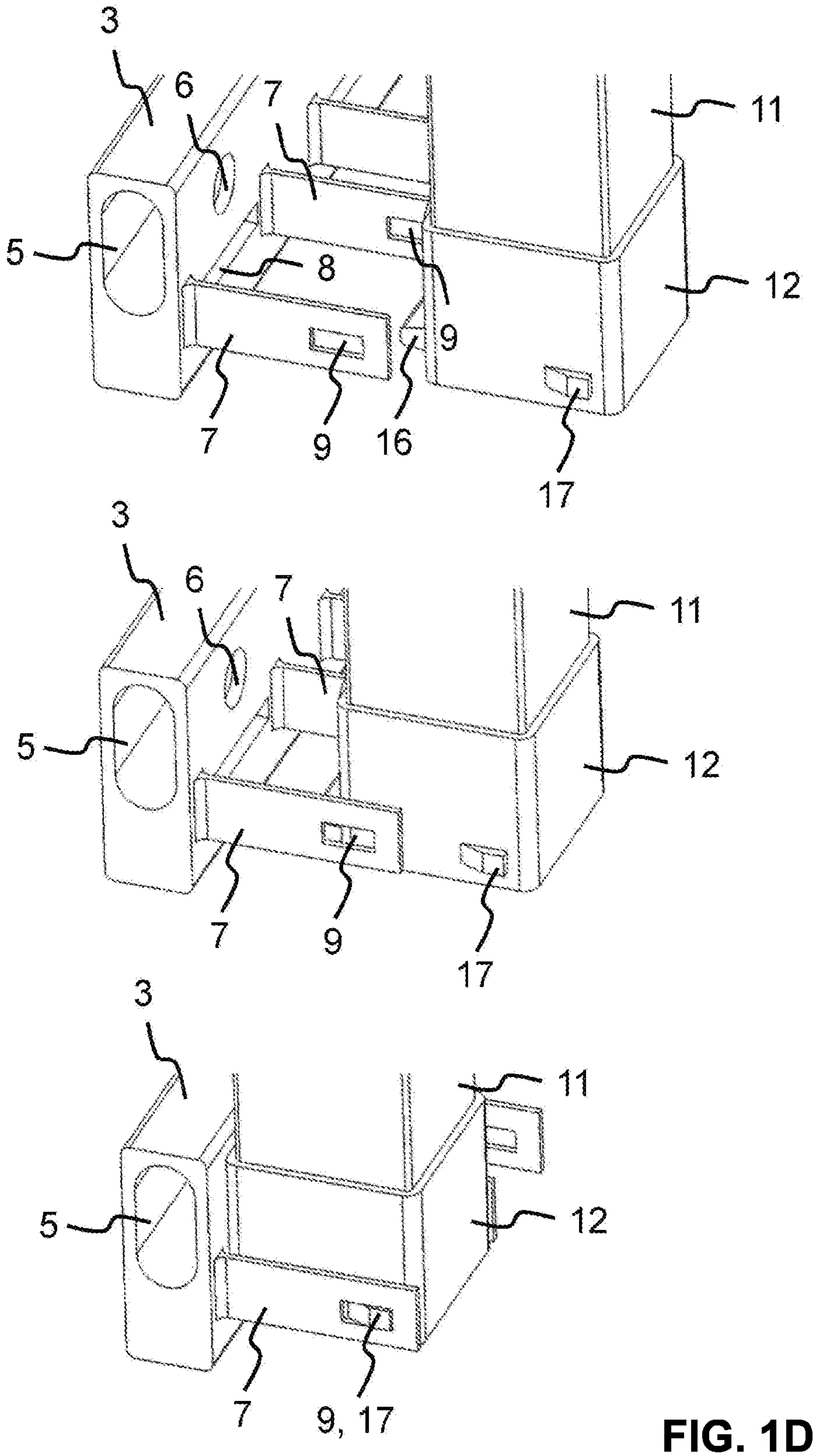
FIG. 1D illustrates three steps for producing the first membrane filter.

FIG. 1D illustrates a partial sectional view of the assembly of a membrane element 2 during production of the first membrane filter 1 in three steps: the bars 7 center the header 12 at the permeate collector 3, so that the permeate outlet 14 is run into the permeate opening 6 and the protrusion 16 is run into the recess 8. The seal ring seals the permeate outlet 14 against the permeate opening 6 in the end position, the protrusion 16 rests in the recess 8 with positive form locking and the two cams 17 of the header 12 engage grooves 9 of the bars 7. The headers 12 and the permeate collector 3 are produced from ABS by injection molding and coloured in a uniform green (Pantone 2287 C).

Figure 2A:
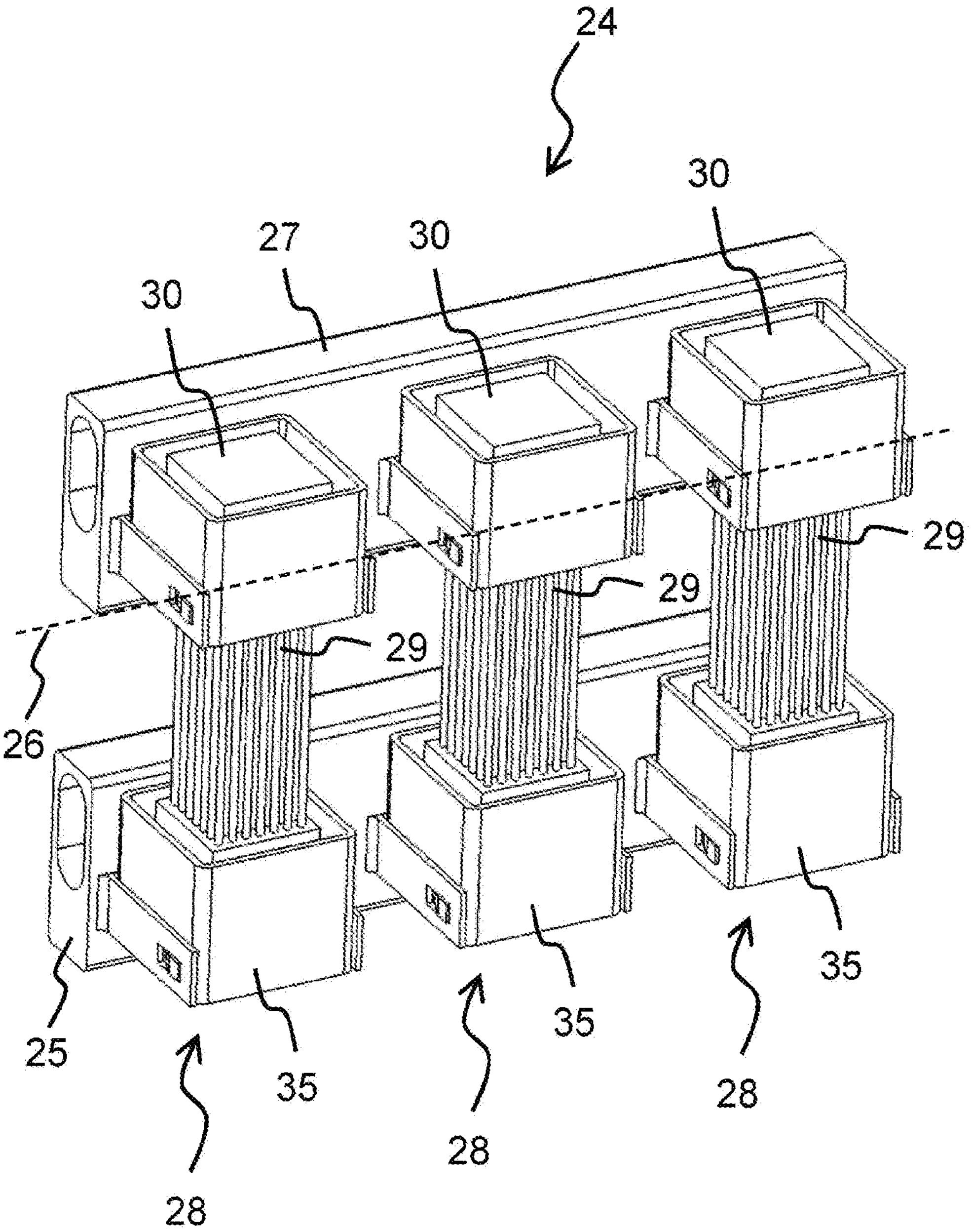
FIG. 2A illustrates a second membrane filter according to the invention.
Figure 2B:
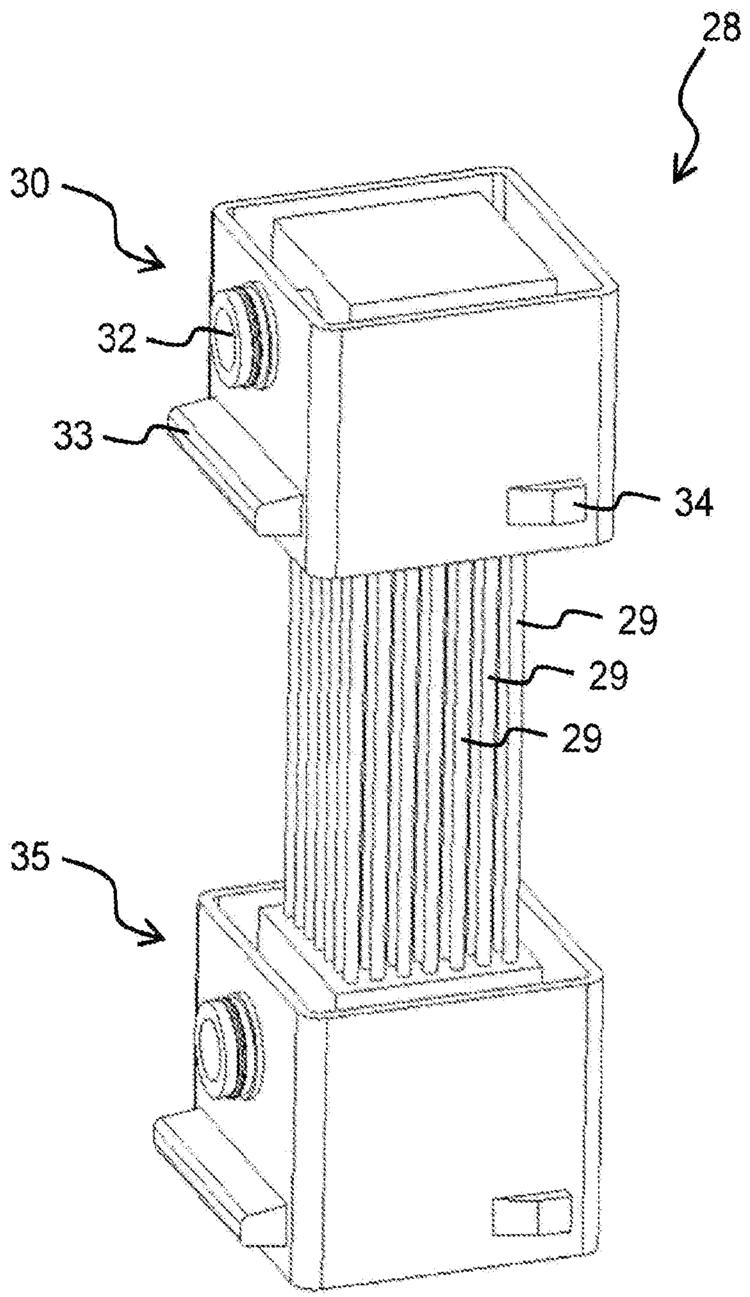
FIG. 2B illustrates a membrane element of the second membrane filter.
Figure 2C:
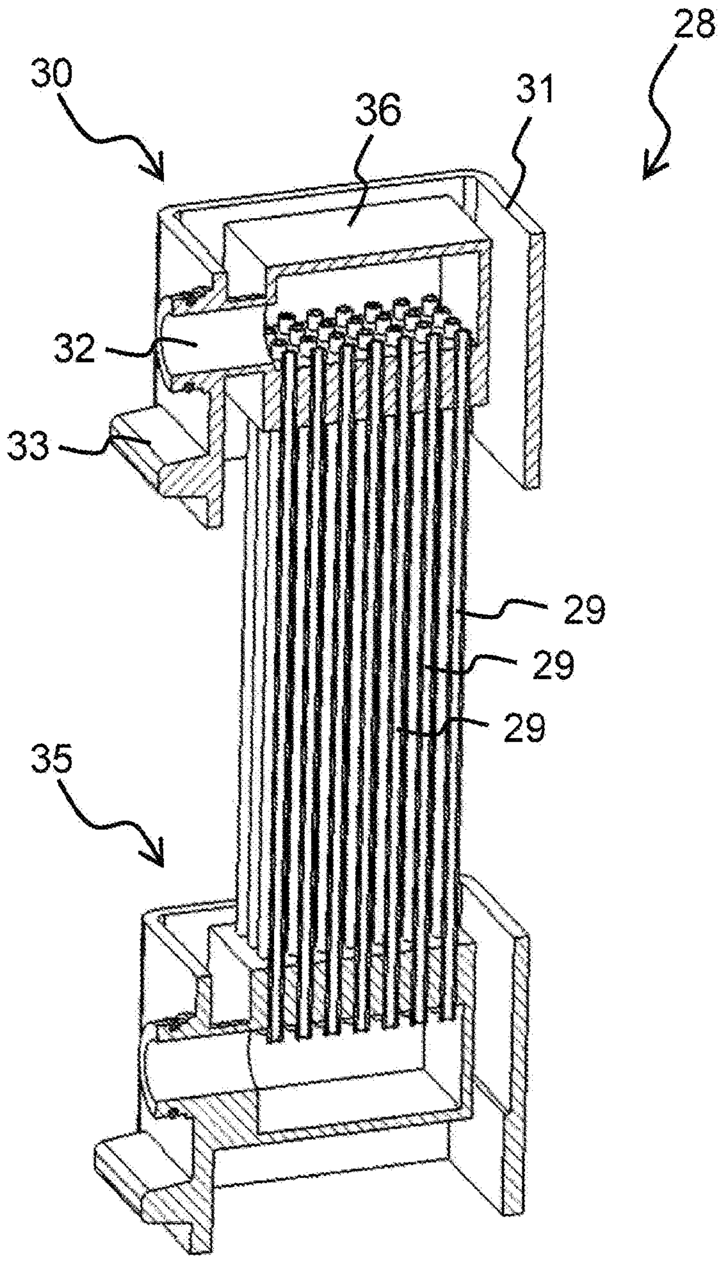
FIG. 2C illustrates a sectional view of the membrane element.

FIG. 2A shows a second membrane filter 24 according to the invention. The second membrane filter 24 essentially corresponds to the first membrane filter 1, however, it includes an additional permeate collector 27 arranged in a non-illustrated frame above the first permeate collector 25 at an additional header level 26. FIG. 2B shows a view of a membrane element 28 of the second membrane filter 24 according to the invention and FIG. 2C shows a sectional view of the membrane element 28.

Differently from the first membrane filter 1 according to the invention the membranes 29 are not closed on top but lead into an additional header 30. The housing 31 of the additional header 30 including the permeate outlet 32 and the protrusion 33 in front and the laterally arranged cam 24 corresponds to the first header 35 arranged at a bottom.

The membrane block 36 in which the membranes 29 are fixed in the additional header 30 is arranged mirror symmetrical to the membrane block of the first header 35. The permeate outlets 32 of the additional headers 30 are connected with the additional permeate collector 27 by non-illustrated permeate openings. The membranes 29 are not enveloped by a tube in the membrane element 28 of the second membrane filter 24.

Figure 3A:
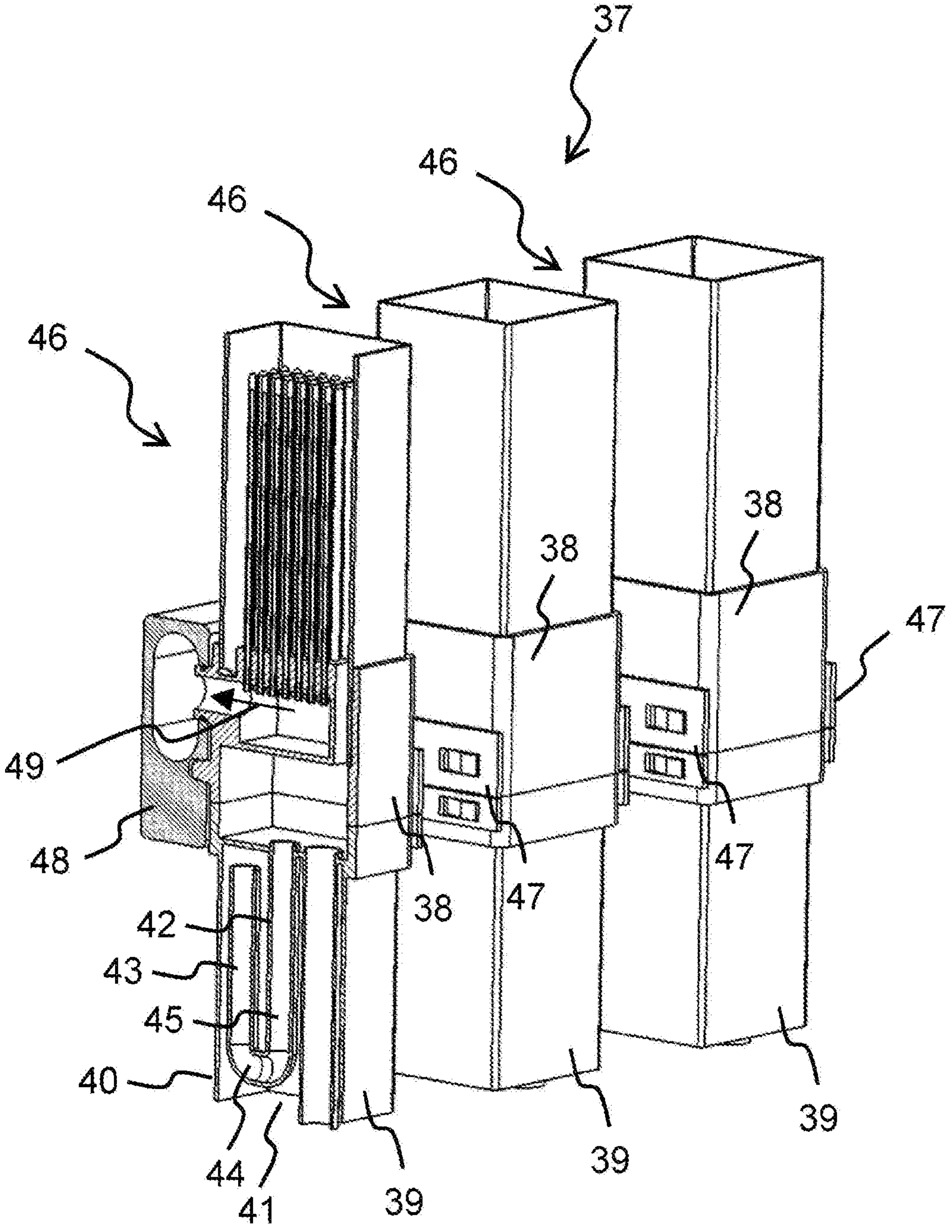
FIG. 3A illustrates a third membrane filter according to the invention.

The third membrane filter 37 according to the invention illustrated in FIG. 3A essentially corresponds to the first membrane filter 1. However, the third membrane filter 37 includes a respective geyser element 39, at a bottom of the headers 38 which differs from the first membrane filter.

The geyser element 39 includes a tubular housing 40 with a rectangular cross section, a downward open collection cavity 41 and an outlet device 42 configured for a pulsed outlet of a non-illustrated gas from the gas collection cavity 41.

The outlet device 42 of the geyser element 39 includes a gas lifting channel 43 for flowing the gas out of the gas collection cavity 41 in a downward direction and in a deflection portion 44 arranged at a bottom of the gas lifting channel and configured to deflect the outflowing gas in an upward direction. A flow out channel 45 adjoins the deflection portion 44 on top and is configured to let the gas out in upward direction from the geyser element 39 into the header 38 of the membrane element 46.

When filling the gas collection cavity 41 with the gas, a non-illustrated liquid level in the gas collection cavity 41 goes down until the liquid level drops below the flow out channel 45. Then the gas flows from above through the gas lifting channel 43 in a downward direction into the deflection portion 44, is deflected in the deflection portion in the upward direction and subsequently flows out of the gas collection cavity 41 through the flow out channel 45 from a top of the geyser element 39 until the gas collection cavity 41 and the outlet device 42 are filled with liquid again from below. Then, the filling process with the gas starts again. This creates a pulsing gas outflow from a top of the geyser element 39 into the membrane element from the continuous gas inflow into a bottom of the geyser element 39.

Figure 3B:
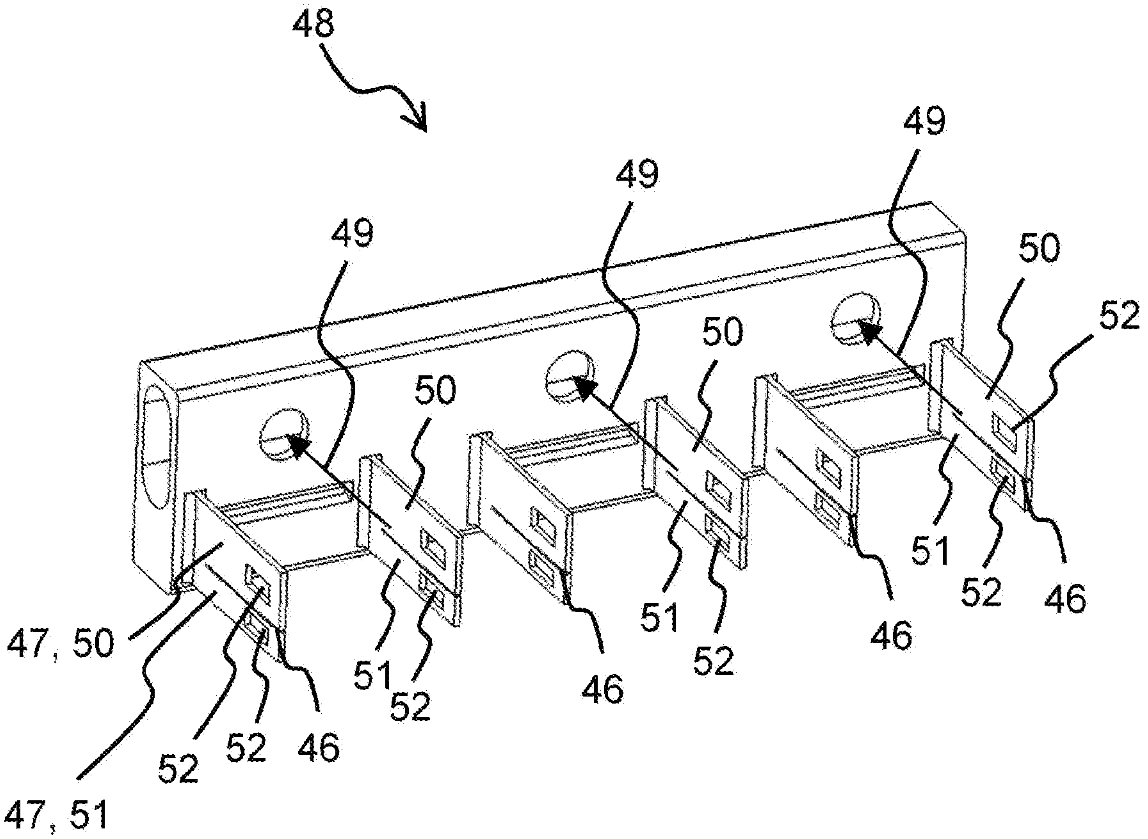
FIG. 3B illustrate a permeate collector of the third membrane filter.

The bars 47 of the permeate collector 48 illustrated in FIG. 3B are divided in the outlet direction 49 and include a respective groove 52 in each component 50, 51 which differs from the first membrane filter 1. The upper parts 50 support the headers 38 and the lower parts 50 support the geyser elements 39.

Figure 4:
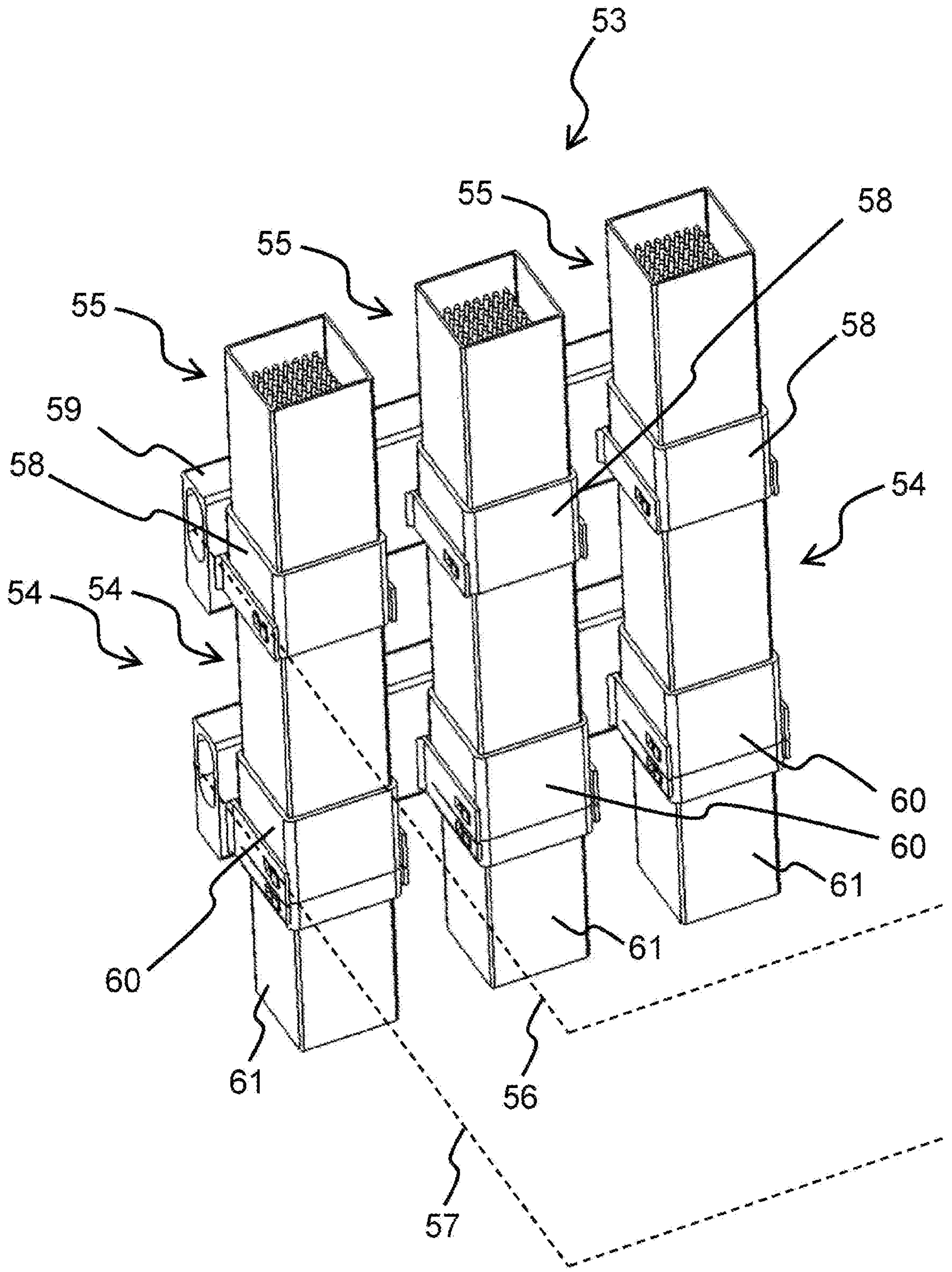
FIG. 4 illustrates a fourth membrane filter according to the invention.

FIG. 4 shows a fourth membrane filter 53 according to the invention. The fourth membrane filter 53 essentially corresponds to the third membrane filter 37. The fourth membrane filter 53 includes additional membrane elements 55 above the first membrane elements 54 which differs from the third membrane filter 37. The additional membrane elements 55 correspond to the first membrane elements 54. Thus, the additional membrane elements 55 are connected at an additional header level 56 above a header level 57 with additional headers 58 at an additional permeate collector 59. Geyser elements 61 are connected below headers 60 arranged at the header level 57, wherein the geyser elements are configured for pulsating inflow of a non-illustrated gas from below into the membrane elements 54.

Figure 5A:
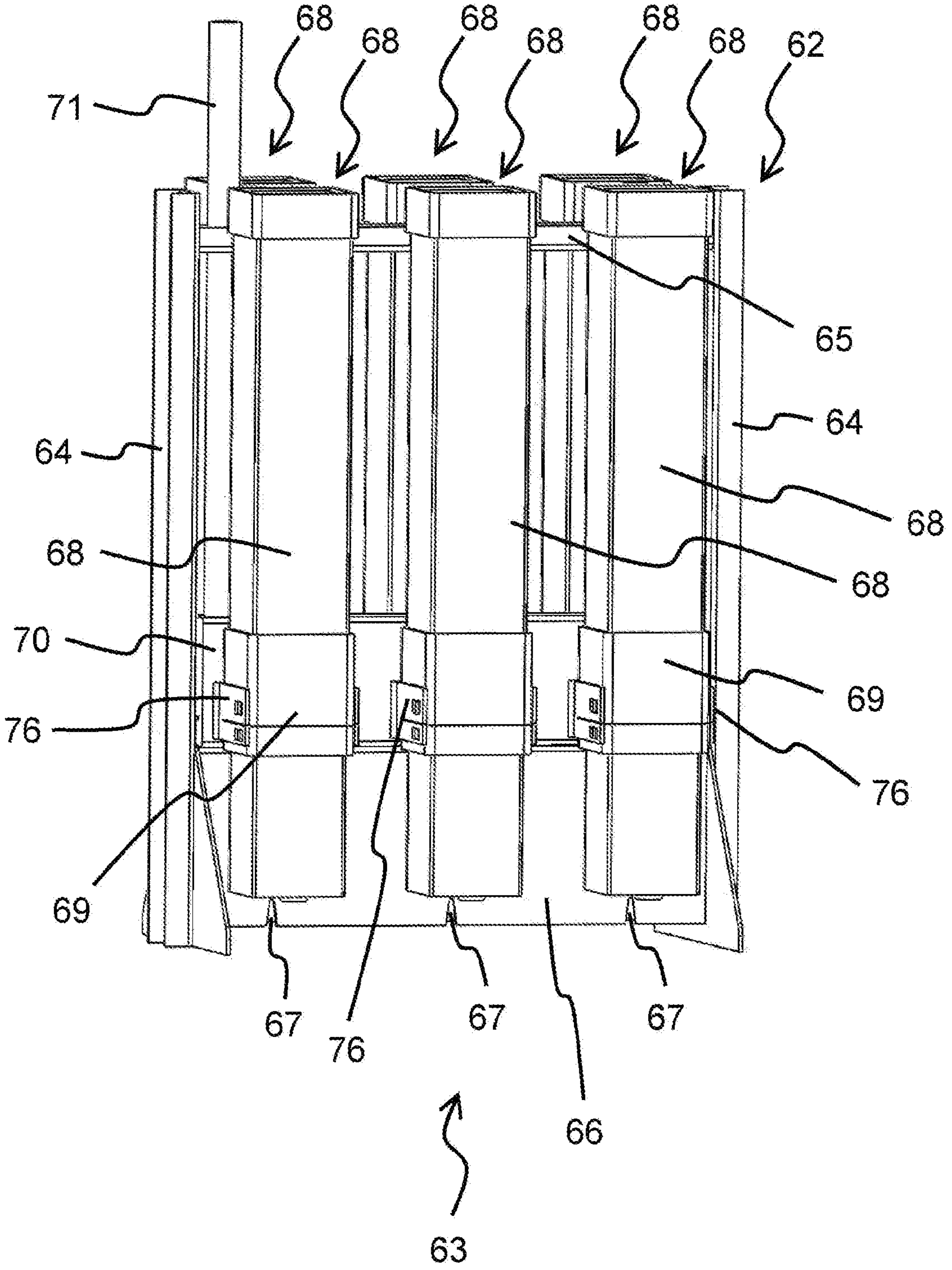
FIG. 5A illustrate illustrates a fifth membrane filter according to the invention.

FIG. 5A shows a fifth membrane filter 63 according to the invention arranged in a frame 62. The fifth membrane filter 63 essentially corresponds to the third membrane filter 37.

The frame 62 welded from stainless steel profiles has a rectangular basic shape including two vertical supports 64 and an upper transversal beam 65 made from a U-profile. A downward open tub 66 made from bent sheet metal plates forms a lower transversal strut. The tub 66 includes lateral downward open wedge-shaped gas outlets 67 configured for flowing a gas out of the tub 66 into membrane elements 68 of the fifth membrane filter 63.

The membrane element 68 are connected with headers 69 at a permeate collector 70. A permeate outlet tube 71 is connected at the permeate collector 70 on top and configured for letting the permeate out of the permeate collector 70.

Figure 5B:
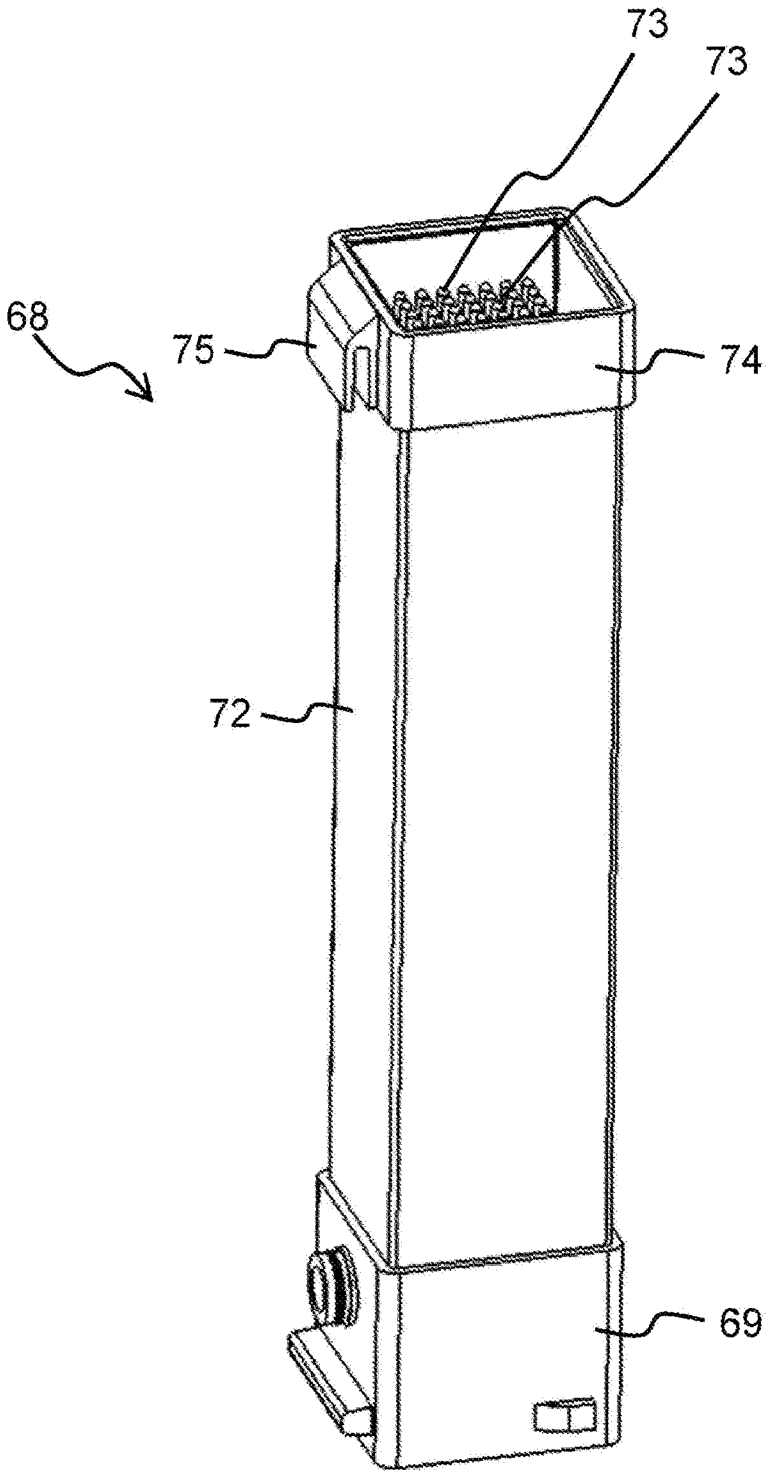
FIG. 5B illustrates a membrane element of the fifth membrane filter.

FIG. 5B shows a detail of the membrane element 68 of the fifth membrane filter 63. The membrane element 68 includes a tube 72 that envelops membranes 73 of the membrane element 68 and a terminal ring 74 arranged on top that includes a hook shaped support 75 at a front of the membrane element 68. The membranes 73 are hollow fiber membranes also in this embodiment.

The preassembled membrane element 68 is engaged with the support 75 at a top of the transversal strut 65 at a preassembled frame 62 in order to mount the fifth membrane filter 63. The header 69 then automatically swings in front of the permeate collector 70, and is slidable almost horizontally between the bars 76 with little force application.

Figure 6:
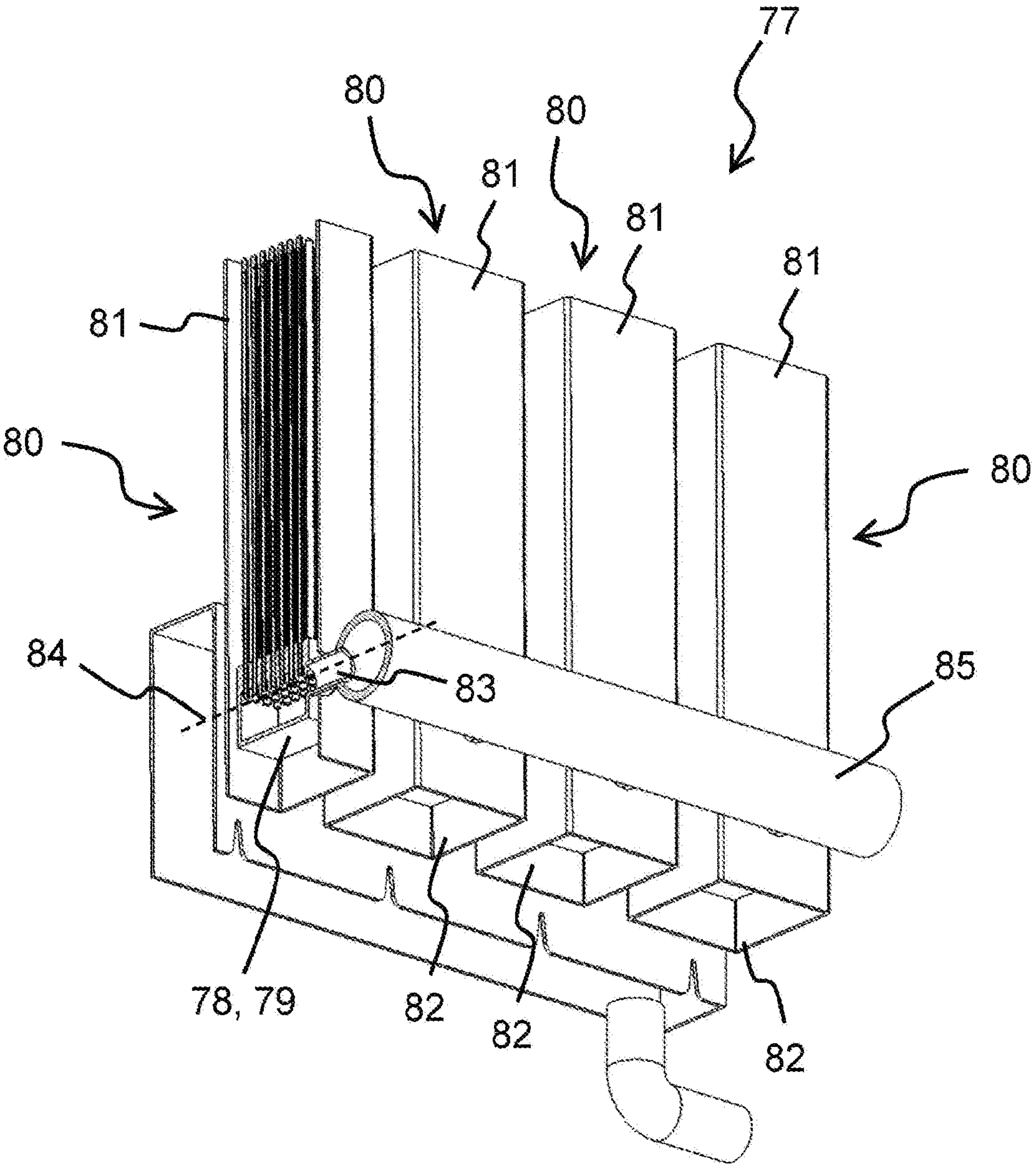
FIG. 6 illustrates a sixth membrane filter according to the invention.

FIG. 6 shows a sixth membrane filter 77 according to the invention having a basic configuration which corresponds to the first membrane filter 1. Differently from the first membrane filter 1, the headers 78 are only made from the membrane blocks 79 and do not include an enveloping housing.

For additional differentiation the membrane elements 80 are enveloped by a common longitudinal continuous tube 81, which includes the inflow opening 82 for the liquid and the gas at a bottom of the tube.

The permeate outlets 83 at the headers 78 penetrate the tube 81 and lead into a tubular permeate collector 85 that is arranged adjacent to the tubes 81 at a header level 84 of the headers 78 and that extends horizontally.

REFERENCE NUMERALS AND DESIGNATIONS

1 membrane filter
2 membrane element
3 permeate collector
4 header level
5 channel
6 permeate opening
7 bar
8 recess
9 groove
10 membrane
11 tube
12 header
13 housing
14 permeate outlet
15 outlet direction
16 protrusion
17 cam
18 membrane block
19 seal layer
20 permeate collection cavity
21 shoulder
22 seal ring
23 flow in opening
24 membrane filter
25 permeate collector
26 additional header level
27 additional permeate collector
28 membrane element
29 membrane
30 additional header
31 housing
32 permeate outlet
33 protrusion
34 cam
35 header
36 membrane block
37 membrane filter
38 header
39 geyser element
40 housing
41 gas collection cavity
42 outlet direction
43 gas lifting channel
44 deflection portion
45 flow out channel
46 membrane element
47 bar
48 permeate collector
49 outlet direction
50 upper part
51 lower part
52 groove
53 membrane filter
54 membrane element
55 additional membrane element
56 additional header level
57 header level
58 additional header
59 additional permeate collector
60 header
61 geyser element
62 frame
63 membrane filter
64 support
65 transversal strut
66 tub
67 gas outlet
68 membrane element
69 header
70 permeate collector
71 permeate outlet tube
72 tube
73 hollow fiber membrane
74 terminal ring
75 support
76 bar
77 membrane filter
78 header
79 membrane block
80 membrane element
81 tube
82 inflow opening
83 permeate outlet
84 header level
85 permeate collector

What is claimed is:

1. A membrane filter for filtering a liquid by submerged operation, the membrane filter comprising:

membrane elements arranged horizontally adjacent to one another and including headers, each membrane element including:

membranes arranged in a vertical longitudinal direction and filtering a liquid permeate from the liquid, wherein each header of the plurality of the headers is arranged at a uniform header level and includes a permeate collection cavity, wherein the membranes are connected at a permeate side of the permeate collection cavity;

a permeate outlet draining the liquid permeate in an outlet direction horizontally from the permeate collection cavity;

a tube connected at a top of each header and laterally enveloping the membranes of the membrane elements, wherein the permeate outlet of each of the membrane elements is connected at a horizontally extending common permeate collector that drains the liquid permeate from the membrane filter, wherein the common permeate collector is arranged at the uniform header level and laterally adjacent to the headers; and protrusions and recesses arranged at the headers; and corresponding recesses arranged at the common permeate collector; and/or recesses arranged at the headers and corresponding protrusions arranged at the common permeate collector, wherein the protrusions protrude into the respective corresponding recesses and fix the headers in the longitudinal direction at the common permeate collector.

2. The membrane filter according to claim 1, further comprising:

at least two bars extending in the outlet direction and arranged at the common permeate collector, wherein a set of two bars of the at least two bars supports a separate header of the headers horizontally and transversal to the outlet direction at the common permeate collector.

3. The membrane filter according to claim 2, further comprising:

interlocking connections between each bar and each header, wherein the interlocking connections fix each header in the outlet direction at the common permeate collector.

4. The membrane filter according to claim 1, wherein the membranes are configured as hollow fiber membranes individually closed on top.

5. The membrane filter according to claim 1, further comprising:

additional headers connected at a permeate side of an additional common permeate collector, wherein the additional headers are connected above the uniform header level at an additional uniform header level.

6. The membrane filter according to claim 1, further comprising:

respective geyser elements arranged at bases of the respective headers and respectively including a downward open gas collection cavity configured to collect an inflowing gas; and an outlet device configured for pulsating exhaust of the gas into a respective header of the headers.

7. A method for producing a membrane filter for submerged operation for filtering a liquid, the method comprising:

arranging membrane elements horizontally adjacent to one another that include headers, each of the membrane elements including:

membranes arranged in a vertical longitudinal direction and configured to filter a liquid permeate from the liquid, wherein each header of the plurality of the headers is arranged at a uniform header level and includes a permeate collection cavity, wherein the membranes are connected at a permeate side of the permeate collection cavity;

a permeate outlet configured to drain the permeate in an outlet direction transversal to the longitudinal direction from the permeate collection cavity, and a tube connected at a top of each header and laterally enveloping the membranes of the membrane elements; and connecting the permeate outlets at a horizontally extending common permeate collector that drains the permeate from the membrane filter, wherein the common permeate collector is arranged at the uniform header level and laterally adjacent to the headers, wherein the headers are connected at the common permeate collector exclusively by form locking.

8. The method according to claim 7, wherein the protrusions are arranged at the headers, and corresponding recesses are arranged at the common permeate collector, and/or wherein the recesses are arranged at the headers and the corresponding protrusions are arranged at the common permeate collector, wherein the protrusions and the recesses are inserted into one another horizontally.

9. The method according to claim 8, wherein the respective headers are inserted at the common permeate collector in the outlet direction between two respective bars, and thus the respective protrusions are inserted into the respective recesses.

10. The method according to claim 9, wherein respective interlocking connections between the respective bars and the respective headers interlock upon insertion.

11. The method according to claim 7, wherein the membrane elements are initially inserted with an upper support into a top of a frame and a respective header of each one of the membrane elements is connected at the common permeate collector thereafter.

12. The method according to claim 7, further comprising:

arranging respective geyser elements at the common permeate collector below the respective headers between two respective bars, wherein the respective geyser elements respectively include a downward open gas collection cavity configured to collect an inflowing gas and an outlet device configured for pulsating exhausting of the gas into a respective header.

* * * * *